United States Patent [19]

Bulow

[11] Patent Number: 4,639,228
[45] Date of Patent: Jan. 27, 1987

[54] ROTATING MULTI-PATH FLUID MANIFOLD

[75] Inventor: Roland E. Bulow, Stamford, Conn.

[73] Assignee: Mobil Oil Corporation, New York, N.Y.

[21] Appl. No.: 685,563

[22] Filed: Dec. 24, 1984

[51] Int. Cl.$^4$ ............................................. B63B 21/52
[52] U.S. Cl. ........................................ 441/5; 141/387
[58] Field of Search ................ 114/230, 256; 441/4–5; 141/387–388; 166/344, 366, 338; 137/236

[56] References Cited

U.S. PATENT DOCUMENTS

| 3,430,670 | 3/1969 | Hopkins | 114/230 |
| 3,735,435 | 5/1973 | Mikulicic et al. | 441/5 |
| 3,742,536 | 7/1973 | Sada et al. | 114/230 |
| 3,911,688 | 10/1975 | Behar et al. | 441/5 |
| 4,173,804 | 11/1979 | Duc | 114/230 |
| 4,270,611 | 6/1981 | Arnaudeau et al. | 141/387 |
| 4,273,066 | 6/1981 | Anderson | 114/230 |
| 4,436,048 | 3/1984 | Gentry et al. | 114/230 |

OTHER PUBLICATIONS

"Transfer System Uses No Swivels", Offshore, May 1985, (p. 204).

Primary Examiner—Sherman D. Basinger
Assistant Examiner—Jesûs D. Sotelo
Attorney, Agent, or Firm—Alexander J. McKillop; Michael G. Gilman; James F. Powers, Jr.

[57] ABSTRACT

A method and apparatus for maintaining fluid flow between a fixed subsea wellhead riser conduit and a weathervaning floating production, storage and off-loading (FPSO) vessel without swivel or sliding seals. The fixed riser conduit is divided into two flowpaths which terminate in connectors. First and second drums, coaxially mounted for rotation about a vertical axis, have connectors which are connectable with the flowpath connectors. The drum connectors are connected to one end of flexible pipes, at least partially wound around a respective drum, with the other end tensioned and connected fixably to the FPSO vessel. Enough flexible pipe is on each drum to permit the drum to rotate about a connection arc of greater than 180° when its respective connector connects one flowpath with the FPSO vessel. The connectors and drums are disposed such that each connection arc overlaps the other arc at both ends of each arc. Fluid flow is maintained through one flowpath until the weathervaning vessel approaches the end of the connection arc. After the overlap region is reached flow is established through the other drum and flowpath connector. When the end of the first flowpath connector arc is reached, the connector is disconnected while fluid flow is maintained in the second flowpath. Should further weathervaning continue such that the first flowpath connection arc is again reached, reconnection of the first drum and flowpath occurs.

17 Claims, 6 Drawing Figures

ROTATING MULTI-PATH FLUID MANIFOLD

BACKGROUND OF THE INVENTION

1. Field of the Invention

The present invention generally relates to manifolds which permit the rotation of one end of the manifold with respect to the other without an interruption of flow therethrough. The present invention specifically relates to multiple path fluid manifolds for the transport of seabed well fluids to a floating production, storage and off-loading (FPSO) vessel.

2. Discussion of the Prior Art

An exposed location FPSO vessel must be able to weathervane on its mooring as the wind direction changes. In the past, multiple path fluid swivels have been employed at the interface between the riser conduit from the seabed well and the vessel in order to permit weathervaning. Such a multi-path swivel can be seen in Gentry et al, U.S. Pat. No. 4,436,048 issued Mar. 13, 1984, herein incorporated by reference. The multi-path swivel assembly 120 is shown generally in FIG. 11 and in more detail in FIGS. 13–16 and discussed between column 14, line 65 and column 15, line 53. Although the conventional multi-path fluid swivel illustrated in the patent is a solution to the weathervaning problem, pressure limitations on the swivel seals prevent the application or use on FPSO vessels in some oil fields. Where pressures above about 2000 psi are encountered, a non-swivel seal such as that in Gentry et al should be used instead. However, if any substantial amount of weathervaning occurred, the FPSO vessel would have to be disconnected from the riser and then reconnected after the desired weathervaning movement had occurred.

SUMMARY OF THE INVENTION

It is an object of the present invention to provide a multiple path manifold for continuously connecting multiple fluid conduits to a vessel, which is free to rotate about the conduits.

It is a further object of the present invention to provide a multiple path manifold, which permits rotation of one end with respect to the other without the necessity of seals or disconnection of the conduit.

It is a further object of the present invention to provide a continuous flow seal-less manifold for connecting one or more conduits from a seabed wellhead riser to a floating production, storage and off-loading (FPSO) vessel.

The above and other objects are achieved in accordance with a method aspect of the present invention by the steps of: dividing at least one conduit from a fixed wellhead riser conduit into first and second flow paths, each flow path equipped with a connector; positioning first and second drums, rotatable in the plane of rotation of the vessel, over said connectors, each of said first and second drums capable of being flexibly connected to said vessel and rotatable with respect thereto through a connection arc in said plane greater than 180°, one arc being positioned with respect to the other arc so as to define zones of overlap at the ends of each arc; establishing a first flow path through connectors to the first drum and vessel when said vessel is positioned within said first connection arc, establishing a second flow path through connectors to the second drum and said vessel when said vessel is positioned within said second connection arc, disconnecting the respective connector prior to angular movement to a position outside the connection arc of the respective drum and repositioning of said disconnected drum and connector when it can be reconnected within said arc of connection.

The above and other objects are achieved in accordance with an apparatus aspect of the present invention, where the vessel is free to rotate in the plane about a fixed wellhead riser conduit, said apparatus comprising: a first drum rotatable in said plane; first means defining at least one conduit channel around the periphery of said first drum; at least a first flexible conduit having one end disposed in said conduit channel; first connector means, disposed on said first drum, for each of said at least a first flexible conduit, for connecting and disconnecting said one end of said at least a first flexible conduit to a first flowpath portion of said at least a fixed riser conduit, said first drum being fixed with respect to said fixed riser conduit when connected to said first flowpath portion; first means for connecting an other end of said at least a first flexible conduit to said vessel, said first drum, said first conduit channel defining means, said first flexible conduit, said first connector means and said first other end connecting means all comprising a first means for permitting rotation of said vessel about a connection arc greater than 180° while said first connector is connected to said first flowpath portion; a second drum rotatable in said plane; second means defining at least one conduit channel around the periphery of said second drum; at least a second flexible conduit having one end disposed in said second conduit channel; second connector means, disposed on said second drum, for each of said at least a second flexible conduit, for connecting and disconnecting said one end of said at least a second flexible conduit to a second flowpath portion of said at least a fixed riser conduit, said second drum being fixed with respect to said fixed riser conduit when connected to said second flowpath portion; second means for connecting an other end of said at least a second flexible conduit to said vessel, said second drum, said second conduit channel defining means, said second flexible conduit, said second connector means and said second other end connecting means all comprising a second means for permitting rotation of said vessel about a connection arc greater than 180° while said second connector is connected to said second flowpath portion, wherein said second permitting means connection arc overlaps said first permitting means connection arc at each end of said first connection arc, and at least one of said first and second connecting means is always connected when said vessel is within one of their respective connection arcs.

BRIEF DESCRIPTION OF THE DRAWINGS

A more complete appreciation of the invention, and many of the attendant advantages thereof, will be readily apparent as the same becomes better understood by reference to the accompanying drawings, wherein.

DETAILED DESCRIPTION OF THE PREFERRED EMBODIMENTS

Figure 1:
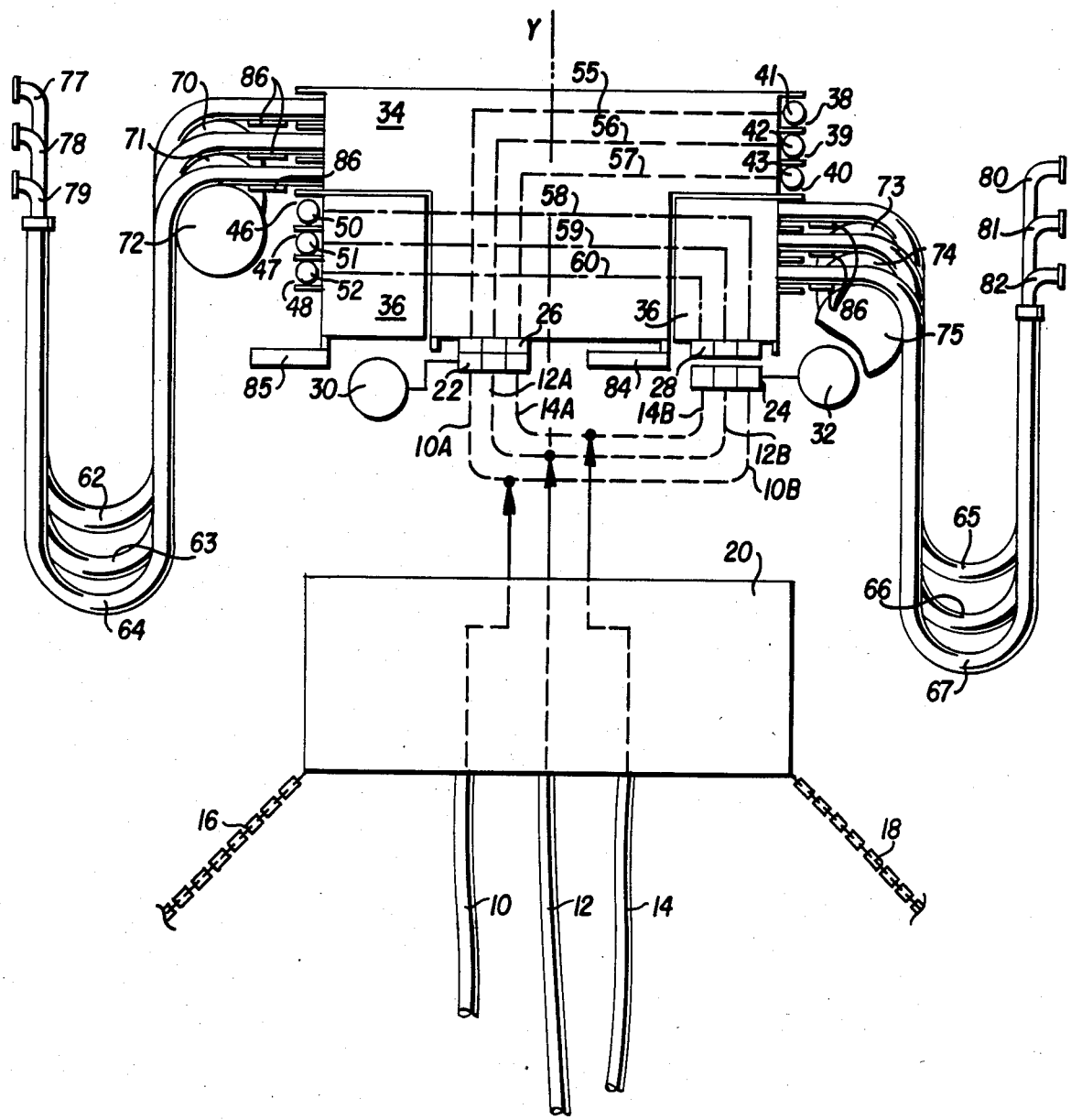
FIG. 1 is a side cross-sectional schematic of a multi-path manifold in accordance with the present invention.

Referring now more particularly to the drawings, wherein like reference numerals represent similar elements throughout the several views, FIG. 1 shows fixed riser conduits 10, 12 and 14, which are connected to a wellhead or group of wellheads or other subsea structures which a vessel could be connected to. The conduits are fixed only to the extent that the vessel will be rotating therearound. Tether chains 16 and 18 may be connected to a turret 20 and anchored on the sea floor with the floating production, storage and off-loading (FPSO) vessel weathervaning therearound.

Although a three-conduit multiple-path manifold is illustrated, any number of multiple paths could be accommodated and it is envisioned that a six-path manifold would be particularly advantageous in FPSO vessel situations. From the turret, each conduit flow path separates into "A" and "B" flowpaths 10A, 10B, 12A, 12B, 14A and 14B. The "A" flowpaths terminate in "A" connector 22, with the "B" flowpath terminating in "B" connector 24. The respective connectors are engageable and disengageable with upper connectors 26 and 28, respectively. These connectors can be conventional wellhead connectors which are mechanically or hydraulically operated and which carry at least the working pressure of the flexible pipe, later on discussed. Such a connector would include isolation valves to seal the respective flowpath when connectors are disconnected, and vent and drain lines to prevent spillage of fluids during disconnection.

The lower connectors on the "A" and "B" flowpaths can be raised into connecting relationship with the upper connectors by actuators 30 and 32, respectively. It may be advantageous to utilize connectors with internal guide pins or flanges so as to ensure the proper orientation with its mating upper portion when the connection is being made by its respective actuator. The actuators could be electrically or mechanically operated, but are preferably hydraulic actuators. Furthermore, it is desirable that these connectors be self-sealing so as to prevent loss of fluid when the connectors are disconnected. The conduits in a preferred embodiment would carry primarily well fluids, such as crude oil, gas and water, but could also be utilized to carry electricity, high pressure hydraulic fluid or high pressure air, as desired. Suitable connectors could be used in the event these additional applications are desirable.

The upper connectors 26 and 28 are connected to first and second drums 34 and 36, which are rotatable on a frame (not shown) mounted on the vessel and in a plane which is parallel to the plane of rotation of the ship about the turret during the weathervaning process. In a preferred embodiment, the rotation is about a vertical axis Y, as shown. First drum 34 has three channels 38, 39 and 40 disposed around its periphery, in which are disposed flexible high pressure pipe portions 41, 42 and 43. Similarly, the second drum has channels 46, 47 and 48, with portions of flexible pipe 50, 51 and 52 disposed therein. Internally disposed in each of said drums is conduit connecting the upper connectors associated with conduits 10A, 12A, 14A, 10B, 12B, and 14B, with flexible pipe portions 41, 42, 43, 50, 51 and 52 which are internal conduits, indicated schematically by dotted lines 55-60, respectively.

The flexible pipe portions 41, 42, 43, 50, 51, 52 may be any flexible pipe consistent with the materials and working pressures contained therein. With respect to wellhead fluids, Coflexip pipe may be advantageously used and obtained from Coflexip and Service, Inc., 4242 SW Freeway, Houston, Tex. Working pressures greater than 15,000 psi, with internal diameters greater than 12 inches are available. The first and second drums 34 and 36 are sized with a radius which is greater than the minimum bending radius of the flexible pipe, such that the pipe can be wound and unwound onto and off of the drums without undue wear. The portions of flexible pipe 41, 42, 43 for flowpath "A" and flexible pipe portions 50, 51 and 52 for flowpath "B" are connected to the fixed internal piping on the FPSO vessel. A desired level of tension on the flexible pipe portions is maintained where the flexible pipe first contacts the drum around which it is wrapped due to the weight of free-hanging bights 62-67 after the portions pass over sheaves 70-75, respectively. The other end portion of the flexible pipe is connected to the FPSO vessel at fixed fittings 77-82. Although, in FIG. 1, fittings 77 and 80 are illustrated on opposite sides of the drawing, it is anticipated that they would be interconnected together at the vessel, since they are both ends of flowpath 10. In the event space permitted, the sheaves and flexible line bights and FPSO vessel fittings could be all located on one side of the first and second drums. Although the sheaves have been illustrated with relatively small diameters, they would have a similar diameter to that of the first and second drum, as would the free-hanging bights, in order to prevent damage to the flexible pipe due to a small radius bend. When the connectors are disconnected, as shown with respect to upper and lower connectors 28 and 24, respectively, a drive means can rotate the drum associated with the disconnected connector, with the free-hanging bight taking up any slack. Although any drive system could be utilized, advantageously hydraulic drive motors 84 and 85 through respective drive gears drive the first drum 34 and the second drum 36 independently about axis of rotation Y in order to position their respective connectors for a sealing engagement.

The operation of the FIG. 1 embodiment may be apparent and is as follows.

Although it is the vessel which rotates or weathervanes around the turret 20 and the fixed conduit from the subsea wellhead, it reviewing the operation of the invention in FIG. 1, it may be easier to consider the turret to be rotating, with the sheaves and fittings connected to the FPSO vessel being fixed. Accordingly, it can be seen that the first drum 34 must rotate as the vessel weathervanes in order maintain its connected position through upper and lower connectors 26 and 22, respectively, with the "A" path of fluid flow through turret 20. As drum 34 rotates, a greater or lesser quantity of flexible conduit is wound into the channels 38, 39 and 40 on the periphery of the drum, depending upon the direction of rotation of the drum. Accordingly, the free-hanging bights 62-64 will either lengthen or shorten, depending on the rotation of the drum. It can be seen that based upon the length of flexible conduit in the bight, that the drum can rotate only a certain number of degrees before the bight has been impermissibly shortened and begins stressing the fixed fittings 77, 78 and 79 (in the case of the conduit being wound onto the drum) or that the interconnection between the flexible conduit and the internal connecting conduits is reached (in the case of the flexible pipe unwinding from the drum).

Drum 36 operates in a similar manner as drum 34. The angular movement over which each drum can move is considered to be the connecting arc of the drum and, in the case of a two-drum system, would have to be greater than 180°. In fact, in a preferred embodiment, each drum would have a connecting arc of 450° and the flexible conduit would be wound on top of itself in the grooved channel. It is also necessary that where the connecting arcs are not greater than 360°, that the arcs overlap at each end with the arc from the other drum. For example, if drums 34 and 36 had connecting arcs of 270° each and the arcs were positioned directly opposite each other, there would be two overlapping areas, one at each end of an arc and equal to 90°.

When drum 34 approaches the end of its connecting arc, the position of the vessel will be such that it is within the connecting arc for the second drum 36. Hydraulic drive motor 85 would be energized and would rotate drum 36 until upper connector 28 was aligned with lower connector 24, either manually or automatically. Once aligned, the "B" flowpath actuator 32 would raise connector 24 into a connecting relationship with the upper connector 28, permitting fluid flow through the "B" flowpath and into the FPSO vessel fittings 80, 81 and 82. At this point, there would be two flowpaths into the FPSO vessel. As additional weathervaning occurred and first drum 34 reached its absolute limit in its connecting arc, the "A" flowpath actuator 30 would disconnect the lower connector 22 from upper connector 26, terminating the dual flowpath flow of wellhead fluids.

In a preferred embodiment, it is the connection of the upper and lower connectors which serve to rotate drums 34 and 36 during weathervaning with respect to the FPSO vessel (actually the vessel rotates around these drums).

As the vessel continues weathervaning through the connecting arc for second drum 36, it will approach the other end of the connecting arc for the first drum 34 and the region of overlap between the two connecting arcs. When this region has been entered by a predetermined number of degrees (in the event the overlap region is 90°, an entry of 45° might be used), drive motor 48 would rotate the first drum 34 so that connectors 22 and 26 are in alignment, whereupon "A" actuator 30 will connect the connectors establishing the "A" flowpath, and there is again a dual flowpath into the FPSO vessel.

By rotating the drums and connecting and disconnecting the drums, it can be seen that any number of rotations of the FPSO vessel about the turret 20 can be accommodated while maintaining at least one flowpath. Although individual connectors will be connected and disconnected, one set of connectors will always be connected and there will always be at least one flowpath for each riser conduit from the wellhead through the turret to the FPSO vessel.

FIG. 1 illustrates a sheave and bight assembly to maintain a desired level of tension on the flexible pipe, as well as a supply of flexible pipe which can be drawn up and wound onto the rotating drums. However, other methods of accomplishing this aspect of the invention are envisioned. For example, a traveling sheave assembly could be used as disclosed in Gentry et al or as more clearly seen in FIG. 2 of Anderson, U.S. Pat. No. 4,273,066 issued June 16, 1981, also herein incorporated by reference. However, Gentry et al, Anderson and the present FIG. 1 embodiment would require some support for the flexible pipe 41-43, 50-52 between the channels 38-40, 46-48 on the periphery of the drum and the sheaves 70-75, over which they pass. The support schematically shown as 86 in FIG. 1 could be in the form of shelves or channels coated with a low friction material, such as Teflon ®, or could have roller bearings or other devices to support the pipe without unduly restricting its movement over the sheaves. However, in a further embodiment of the present invention, the requirement for such supports has been eliminated by transfering the line directly from the periphery of one drum to the periphery of another drum rotating at an angle thereof, preferably 90°.

Figure 2A:
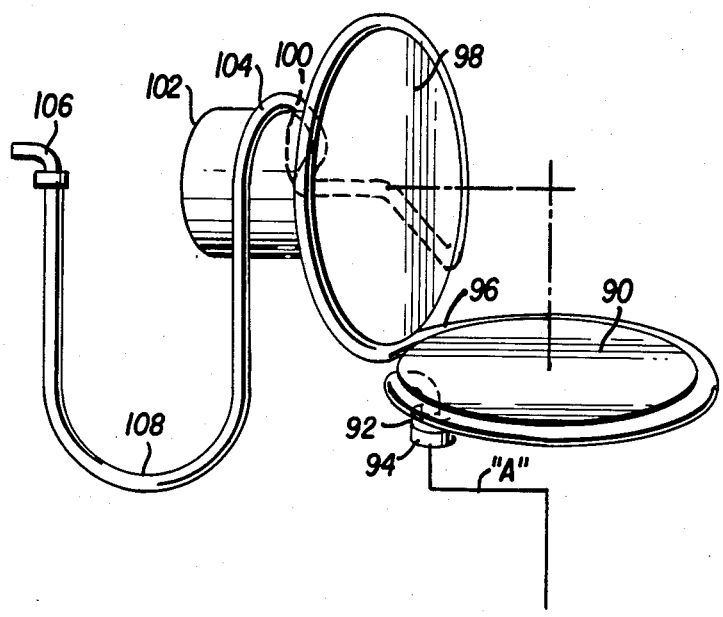
FIGS. 2A–2C are side perspective views of a simplified portion of the present invention illustrating the operation of a portion of the FIG. 3 embodiment.
Figure 2B:
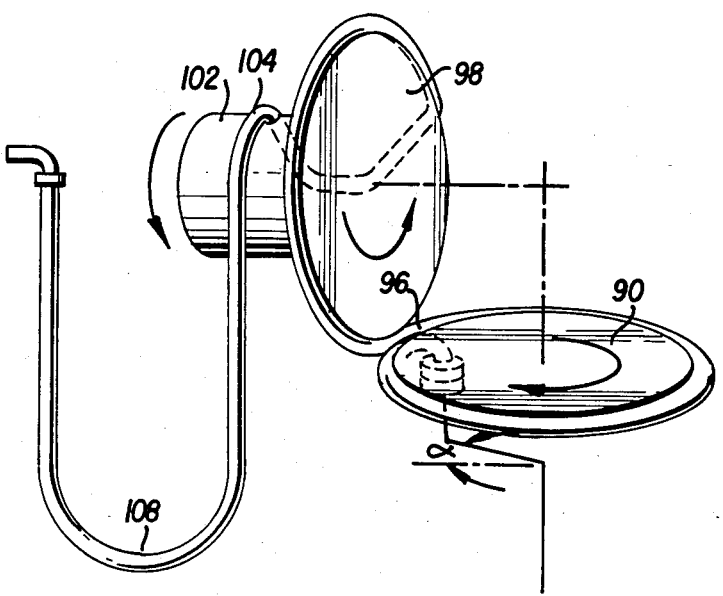
Figure 2C:
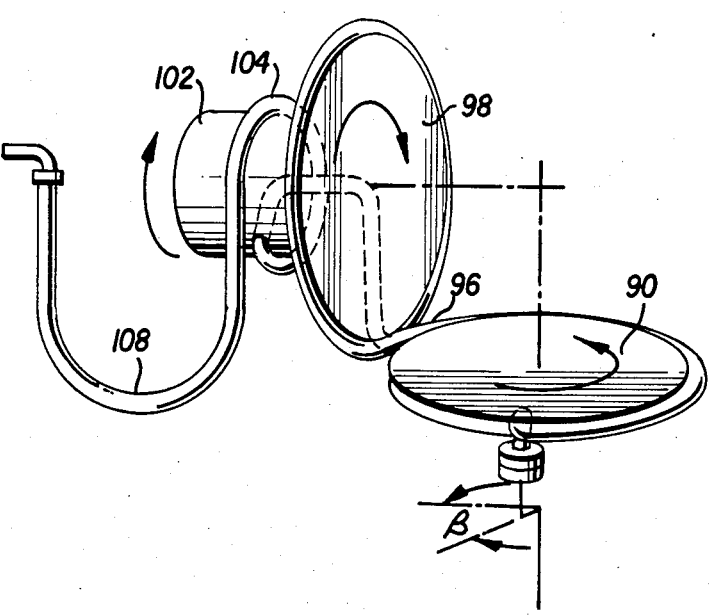

FIGS. 2A-2C illustrate the concept of a preferred embodiment of the present invention which eliminates the need for the above-described supports. In FIG. 2A, the vertical axis drum, represented by disc 90, includes the upper and lower connector portions 92 and 94, respectively, which serve to interconnect the "A" flowpath with one end of the flexible pipe 96 disposed around its periphery. The other end of the flexible pipe is disposed around the periphery of a horizontal axis drum, schematically illustrated by disc 98. An internal conduit 100 connects an end portion of flexible pipe 96 to a takeup drum 102 affixed to disc 98, whereupon the conduit 100 connects with a further flexible pipe segment 104 connected between internal conduit 100 and fixed FPSO vessel fitting 106, forming bight 108.

In FIG. 2B, the illustration indicates that the disc 90 has been rotated clockwise an angular amount equal to $\alpha$ (or depending upon one's perspective, the FPSO vessel can be considered to have rotated counterclockwise an amount equal to $\alpha$), with respect to the orientation illustrated in FIG. 2B. It can be seen that this rotation requires more flexible pipe 96 to be wound onto the vertical axis drum 90, and less flexible pipe will be wound on the horizontal axis drum 98. Because the horizontal axis drum has rotated counterclockwise, it will effectively "unwind" flexible pipe 104 off of the takeup drum 102, increasing the length of bight 108.

In FIG. 2C, the rotation of the vertical axis drum 90 has been counterclockwise (or the FPSO vessel has rotated in a clockwise direction) an angular amount equal to $\beta$, serving to unwind a portion of flexible pipe 96 from the periphery of the vertical axis drum. This additional amount is wound onto the periphery of the horizontal axis drum 98 and rotation of the horizontal axis drum 98 causes takeup drum 102 to wind on a greater portion of flexible pipe segment 104, reducing the length of bight 108.

It can be seen that the utilization of two drums having axes of rotation at an angle can serve to transfer the flexible conduit from a channel around the periphery of one drum to the channel around the periphery of another drum without the need for a separate structure to support the flexible conduit. If this is combined with internal conduit connecting the flexible pipe end on the horizontal axis drum to the flexible pipe end on a takeup drum from which the free-hanging bight falls, there will be no need for any additional support structure at all. While it can be seen that the rotation of vertical axis drum 90 in the clockwise direction (FIG. 2B) will cause the counterclockwise rotation of the horizontal axis drum 98 (by virtue of the flexible conduit being withdrawn from the periphery of disc 98), it may be necessary to provide a rotational bias to the horizontal axis drum in order to wind the flexible pipe 96 onto its periphery when it rotates in a clockwise direction (FIG. 2C). The bias could be the weight of the bight, in which case it would have to be wound around the takeup drum 102 in the opposite direction from that illustrated in FIG. 2C. Alternatively, and more preferably, the periphery of the two drums could be interconnected by either gear teeth (in much the same manner as a 90° gear drive) or by an endless drive belt or cable circumferentially connecting both drums. Although only a single flowpath "A" and the drums associated therewith are illustrated in FIGS. 2A-2C, a preferred embodiment of the present invention utilizes two flowpaths and is illustrated in FIG. 3.

Again, a three flowpath manifold system is illustrated, although the number of paths could be greater or less than 3. Fixed riser conduits 110, 112 and 114 terminate in junctions with flexible pipe forming the "A" and "B" flowpaths, passing fluids contained in the fixed riser conduits 110, 112, 114 into a plurality of lower connector portions 122 and 124 for the "A" and "B" flowpaths. In this embodiment, the details of the wellhead connector and the hydraulic actuator can be seen for only flowpath 110 "A" and "B", as the connectors and actuators for the other flowpaths are hidden from view. The lower connectors 122 and 124, upper connectors 126 and 128 and hydraulic actuators 130 and 132 for the 110 "A" and "B" flowpaths, respectively, are illustrated. The "B" flowpath is shown disconnected, with the "A" flowpath shown connected in FIG. 3.

A first conical drum 134 is mounted for rotation about a vertical axis Y on support frame 135, which is secured to turret 120. A second conical drum 136 is also mounted for rotation about the vertical axis Y on the support frame 135. Channels 138-140 are provided in the first conical drum 134, with channels 146-148 provided in the second conical drum 136 for the 110, 112 and 114 flowpaths, respectively. Drive motors 184 and 185 drive the first conical drum 134 and the second conical drum 136, respectively. Adjacent the first and second conical drums, which rotate in the vertical axis, are first and second conical drums 141 and 142, respectively, which rotate in the horizontal axis. Immediately adjacent first conical drum 134 channels 138-140 are channels 149-151 on the first horizontal axis conical drum 141. Similarly, immediately adjacent channels 146-148 on the second vertical axis conical drum 136, there are disposed channels 154-156 on the outer periphery of the second horizontal axis conical drum 142.

Figure 3:
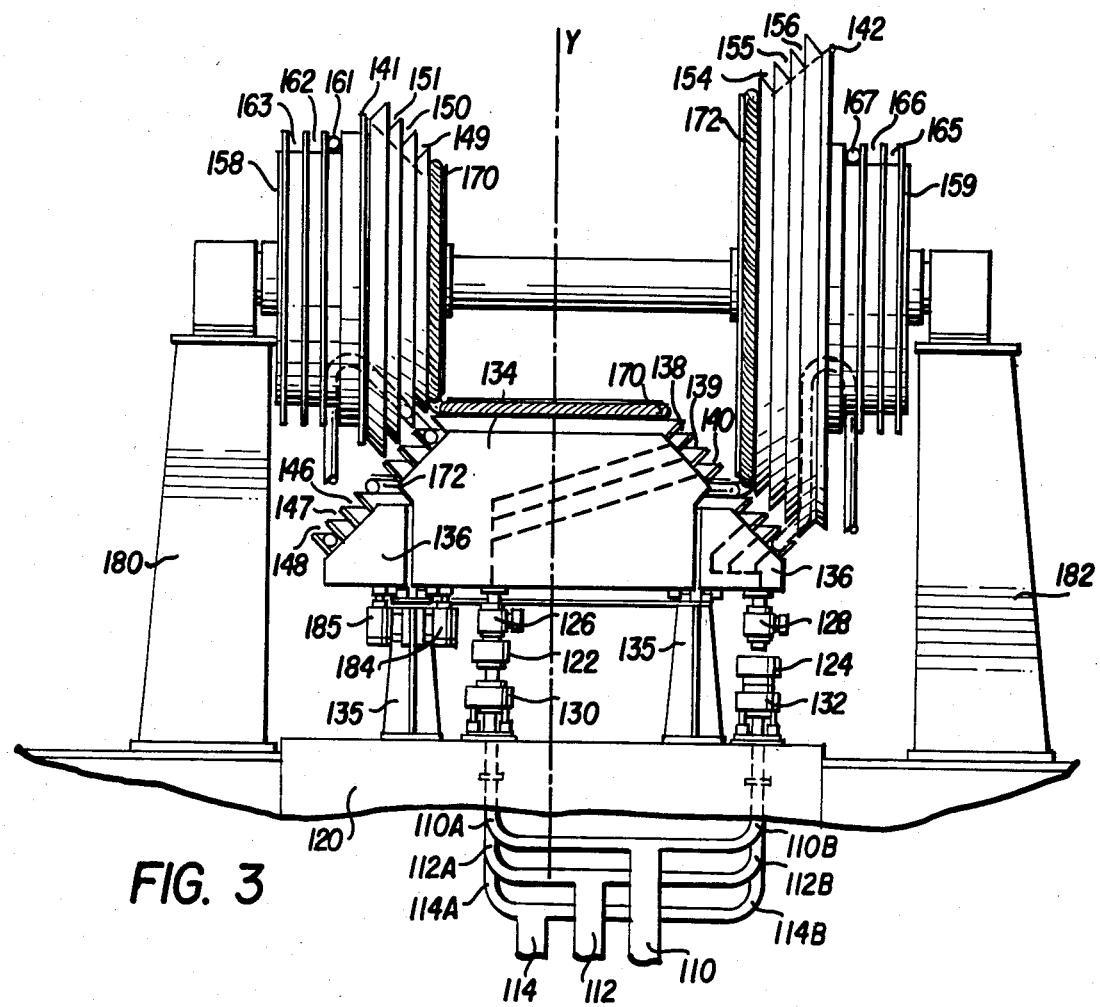
FIG. 3 is a side view partially in section of a further embodiment of the present invention.

As in the schematic shown in FIG. 2A, the respective horizontal axis and vertical axis drums are interconnected by means of flexible pipe disposed in their respective channels and serves to connect internal conduits on each of the vertical axis drums, with corresponding internal conduits on each of the horizontal axis drums (unnumbered for clarity sake in FIG. 3). FIG. 3 illustrates only a single flexible pipe and, in phantom lines, an internal conduit in the horizontal axis drums. The internal conduit on the vertical axis drums are shown schematically by the dotted lines.

First and second horizontal axis conical drums 141 and 142 each have takeup drums 158 and 159, which have channels 161-163 and 165-167, respectively, thereon. Interconnected to the internal connecting conduits are flexible pipe segments wich are disposed in channels 161-163 and 165-167. These flexible pipe segments form free-hanging bights and are connected to fixed fittings on the FPSO vessel, in the manner described and disclosed with reference to FIGS. 2A-2C.

The operation of the first and second vertical axis conical drums, the connectors 122, 124, 126, 128, their actuators 130 and 132 and drive motors 184 and 185 all operate in a sequence, in a manner discussed with reference to FIG. 1. However, where the FIG. 1 embodiment takes the flexible pipe from the drum in a horizontal direction (thus requiring some type of support structure), the FIG. 3 embodiment withdraws the pipe from the conical drum channels in a vertical direction and then internally connects the pipe to another portion of flexible pipe on the takeup drums. Consequently, the three bights (not shown) can hang from each of the takeup drums 158 and 159 without the need for additional support structures.

As discussed earlier, any number of flowpaths could be used in the FIG. 3 embodiment and different hose diameters and wellhead connectors could be utilized, depending upon the pressures and flow rates required by the specific seabed well. As discussed with reference to FIG. 2A, the rotation of the horizontal axis conical drums and takeup drums could be by geared drive motors, so as to maintain the appropriate tension on the flexible pipe but, in a preferred embodiment, a mechanical belt or cable would serve to rotate the horizontal axis drums in synchronism with the vertical axis drums. Cables 170 and 172, shown in FIG. 3, would accomplish this result.

It is important to note that the smallest diameter channels 138 and 149 would have a radius equal to or larger than the minimum bend radius of the flexible pipe. Further, although in a preferred embodiment the diameters of adjacent horizontal and vertical axis channels would be equal, the diameters could be different. The angular relationship between the axes of rotation could be greater than or less than 90° as long as the apexes of the cones are coincident (which insures a matched peripheral velocity in the adjacent channels).

It should further be noted that although the first and second vertical axis conical drums are mounted on support frame 135, which is in turn mounted on the rotating turret, they could also be mounted on frames 180 and 182 which support the horizontal axis drums. In this manner, the only structures present on the turret would be the lower connectors and their respective actuators.

Figure 4:
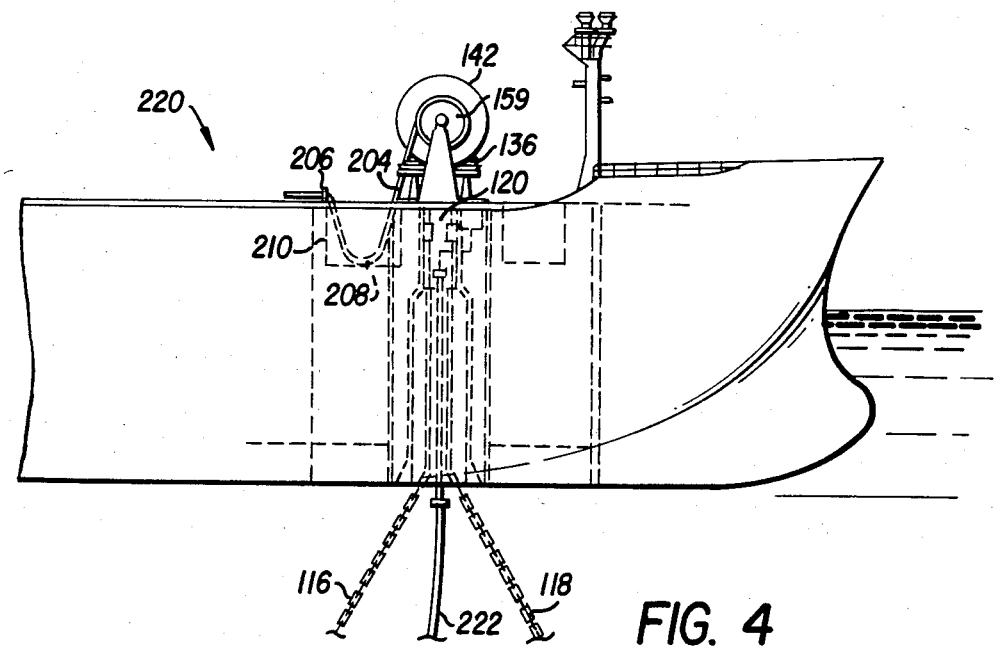
FIG. 4 is a side view illustrating one embodiment of the present invention installed in a floating production, storage and off-loading (FPSO) vessel.

FIG. 4 illustrates the placement and orientation of the FIG. 3 device, except that only the second vertical axis drum 136 and second horizontal axis drum 142, along with takeup drum 159, are visible. However, bight 208 of flexible pipe segment 204 can be seen disposed in well 210, and interconnected with fittings 206 on FPSO vessel 220. It is clear that due to the influence of tether chains 116 and 118 the turret system 120 will maintain a relatively fixed position, permitting vessel 220 to weathervane therearound, with the apparatus disclosed in more detail in FIG. 3 providing continuous interconnection between the fitting at 206 and the wellhead riser 222.

In view of the above disclosure, many modifications and variations on the method steps and apparatus disclosed in FIGS. 1-4 will be obvious to those of ordinary skill in the art. As previously noted, the physical size of the arrangement will be governed by sizes compatible with the flexible hoses chosen, which choice will be determined in large part by the operational environment, such as desired flow rate and working pressure of the fluids. Although a preferred embodiment would utilize only two drums, with each drum capable of maintaining connection through an arc of 450°, drums of greater or lesser angular connection range could be utilized. The only limitation is that when only two drums are used (three drums could be used, each having a connecting arc at least greater than 120°), each of the two drums must have a connecting arc greater than 180°, such that each end of each drum's connecting arc overlaps the other drum's connecting arc so as to maintain continuous flow therethrough. Depending upon the size of the drums and the flexible pipe being used, the frictional requirements may dictate mechanical, electrical, hydraulic, or some other power source for rotating and positioning the drums and for actuating the connectors. Further, the entire system could be automated by the use of limit switches and computer control which would trigger the disconnection, the drive motor operation to rotate a drum to a new connection position, and reconnection of the desired connectors without human intervention. Therefore, the present invention is not limited by the above disclosure, and is limited only by the scope of the claims attached hereto.

The embodiments of the invention, in which an exclusive property or privilege is claimed, are defined as follows:

1. A method of continuously withdrawing fluids from at least a fixed riser conduit into a vessel which is free to rotate in a plane, comprising the steps of:

dividing said at least a fixed riser conduit into first and second flowpaths, each flowpath ending in a separate connector;

positioning first and second drums, each having a connector and rotatable in said plane, over said flowpath connectors, each of said first and second drums capable of being flexibly connected to said vessel and rotatable during connection with respect to said vessel through a connecting arc greater than 180°, with the connecting arc for one drum overlapping the connecting arc of the other drum at both ends of each connecting arc;

establishing a first flowpath through connectors to the first drum and vessel when said vessel is positioned within the first drum connecting arc, establishing a second flowpath through connectors to the second drum and said vessel when said vessel is positioned within said second drum connecting arc, disconnecting the connector associated with a drum prior to angular movement of the drum outside its connecting arc; and repositioning of said disconnected drum and its associated connector in order that it may be reconnected within its connecting arc.

2. A multi-path manifold for continuously connecting at least a fixed riser conduit to a vessel, said vessel rotatable with respect to said conduit in a plane, said manifold comprising:

a first drum rotatable in said plane;

first means defining at least one conduit channel around the periphery of said first drum;

at least a first flexible conduit having one end disposed in said first means conduit channel;

first connector means, disposed on said first drum, for each of said at least a first flexible conduit for connecting and disconnecting said one end of said at least a first flexible conduit to a first flowpath portion of said at least a fixed riser conduit, said first drum being fixed with respect to said fixed riser conduit when connected to said first flowpath portion;

first means for connecting an other end of said at least a first flexible conduit to said vessel, said first drum, said first conduit channel defining means, said first flexible conduit, said first connector means and said first other end connecting means all comprising a first means for permitting rotation of said vessel about a first connection arc greater than 180° while said first connector means is connected to said first flowpath portion;

a second drum rotatable in said plane;

second means defining at least one conduit channel around the periphery of said second drum;

at least a second flexible conduit having one end disposed in said second means conduit channel;

second connector means, disposed on said second drum, for each of said at least a second flexible conduit, for connecting and disconnecting said one end of said at least a second flexible conduit to a second flowpath portion of said at least a fixed riser conduit, said second drum being fixed with respect to said fixed riser conduit when connected to said second flowpath portion; and second means for connecting an other end of said at least a second flexible conduit to said vessel, said second drum, said second conduit channel defining means, said second flexible conduit, said second connector means and said second other end connecting means all comprising a second means for permitting rotation of said vessel about a second connection arc greater than 180° while said second connector means is connected to said second flowpath portion, wherein said second connection arc overlaps said first connection arc at each end of said first connection arc, and at least one of said first and second connecting means is always connected when said vessel is within their respective connection arcs.

3. A multi-path manifold in accordance with claim 2, wherein said first connecting means comprises:

first means for tensioning each of said at least a first flexible conduit in a direction tangent to said first conduit channel defining means; and first means for mating each of said at least a first flexible conduit other end to a respective fixed fitting on said vessel;

wherein said second connecting means comprises:

second means for tensioning each of said at least a second flexible conduit in a direction tangent to said second conduit channel defining means; and second means for mating each of said at least a said second flexible conduit other end to a respective fixed fitting on said vessel.

4. A multi-path manifold in accordance with claim 3, wherein said plane is generally horizontal and said first tensioning means comprises first sheave means for guiding said at least a first flexible conduit over a change of direction from generally horizontal to generally vertical, where said first meating means and said first sheave means comprise at least a first means defining a variable length bight in said at least a first flexible conduit; and wherein said second tensioning means comprises second sheave means for guiding said at least a second flexible conduit over a change of direction from generally horizontal to generally vertical, where said second mating means and said second sheave means comprise at least a second means defining a variable length bight in said at least a second flexible conduit.

5. A multi-path manifold in accordance with claim 4, wherein said first flowpath portion includes:

a first connector portion engageable with said first connector means; and first actuator means for controllably engaging and disengaging said first connector portion with said first connector means;

wherein said second flowpath portion includes:
- a second connector portion engageable with said second connector means; and
- second actuator means for controllably engaging and disengaging said second connector portion with said second connector means.

6. A multi-path manifold in accordance with claim 5, wherein each of said connection arcs comprises an arc of at least 270°.

7. A multi-path manifold in accordance with claim 6, wherein each of said connection arcs comprises an arc of substantially 450°.

8. A multi-path manifold in accordance with claim 5, further including:
- first drive means for controllably rotating said first drum and first connector means to an engagement position with said first flowpath portion when said vessel is within said first connection arc; and
- second drive means for controllably rotating said second drum and said second connector means to an engagement position with said second flowpath portion when said vessel is within said second connection arc.

9. A multi-path manifold in accordance with claim 2, wherein said plane is generally horizontal and said drums are conical and rotate about a vertical axis, wherein said first connecting means comprises:
- a first conical drum rotatable about a first horizontal axis;
- first means defining at least one conduit channel around the periphery of said first horizontal axis drum, said first drums disposed such that a tangent to said at least one conduit channel in said vertical axis drum is substantially coincident with a tangent to said at least one conduit channel in said horizontal axis drum, wherein said other end of said at least a first flexible conduit passes from said first vertical axis drum conduit channel to said first horizontal axis drum conduit channel;
- a first takeup drum rotatable with said first horizontal axis drum, about said first horizontal axis;
- first means defining conduit channels around at least a portion of the periphery of said first takeup drum;
- at least a further first flexible conduit having one end disposed in said first takeup drum conduit channel and an other end;
- first means for fixably attaching said other end of said at least a further first flexible conduit to said vessel, said first fixable attaching means, said first takeup drum conduit channel defining means and said at least a further first flexible conduit comprising a means defining a variable length bight in said further first flexible conduit; and
- means for interconnecting said other end of said at least a first flexible conduit to said one end of said at least a further first flexible conduit;

wherein said second connecting means comprises:
- a second conical drum rotatable about a second horizontal axis;
- second means defining at least one conduit channel around the periphery of said second horizontal axis drum, said second drums disposed such that a tangent to said at least one conduit channel in said second vertical axis drum is substantially coincident with a tangent to said at least one conduit channel in said second horizontal axis drum, wherein said other end of said at least a second flexible conduit passes from said second vertical axis drum conduit channel to said second horizontal axis drum conduit channel;
- a second takeup drum rotatable with said second horizontal axis drum, about said second horizontal axis;
- second means defining conduit channels around at least a portion of the periphery of said second takeup drum;
- at least a further second flexible conduit having one end disposed in said second takeup drum conduit channel and an other end;
- second means for fixably attaching said other end of said at least a further second flexible conduit to said vessel, said second fixable attaching means, said second takeup drum conduit channel defining means and said at least a further said flexible conduit comprising a second means defining at least a variable length bight in said further second flexible conduit; and
- means for interconnecting said other end of said at least a second flexible conduit to said one end of said at least a further second flexible conduit.

10. A multi-path manifold in accordance with claim 9, wherein said first flowpath portion includes:
- a first connector portion engageable with said first connector means; and
- first actuator means for controllably engaging and disengaging said first connector portion with said first connector means;wherein said second flowpath portion includes:
- a second connector portion engageable with said second connector means; and
- second actuator means for controllably engaging and disengaging said second connector portion with said second connector means.

11. A multi-path manifold in accordance with claim 10, wherein each of said connection arcs comprise an arc of at least 270°.

12. A multi-path manifold in accordance with claim 11, wherein each of said connection arcs comprise an arc of substantially 450°.

13. A multi-path manifold in accordance with claim 9, further including:
- first drive means for controllably rotating said first vertical axis drum and said first connector means to an engagement position with said first flowpath portion when said vessel is within said first vertical axis drum connection arc; and
- second drive means for controllably rotating said second vertical axis drum and said second connector means to an engagement position with said second flowpath portion when said vessel is within said second vertical axis drum connection arc.

14. A multi-path manifold in accordance with claim 13, further including:
- first means for insuring the equality of peripheral rotation speed between said first horizontal axis drum and said first vertical axis drum; and
- second means for insuring the equality of peripheral rotation speed between said second horizontal axis drum and said second vertical axis drum.

15. A multi-path manifold in accordance with claim 9, wherein said first conical drum and said second conical drum are rotatable about the same horizontal axis.

16. A method of continuously withdrawing fluids from at least a fixed riser conduit into a vessel which is free to rotate in a plane, comprising the steps of:
 dividing said at least a fixed riser conduit into a plurality of flowpaths, each flowpath ending in a separate connector;
 positioning a plurality of drums, each drum including a connector and rotatable in said plane, over said flowpath connectors, each of said drums capable of being flexibly connected to said vessel and rotatable during connection with respect to said vessel through a connecting arc, where the sum of said plurality of connecting arcs is greater than 360°, with the connecting arc for one drum overlapping the connecting arc of an adjacent drum at both ends of said one drum connecting arc;
 establishing a flowpath through connectors to respective drums and said vessel when said vessel is positioned within said respective connecting arc and disconnecting the connector associated with any drum prior to angular movement of said any drum outside its connection arc; and
 repositioning of said any disconnected drum and its associated connector in order that it may be reconnected with its connecting arc.

17. A multi-path manifold for continuously connecting at least a fixed riser conduit to a vessel, said vessel rotatable with respect to said conduit in a plane, said manifold comprising:
 a plurality of drums rotatable in said plane;
 means defining at least one conduit channel around the periphery of each of said drums;
 a plurality of flexible conduits each associated with one of said plurality of drums, each conduit having one end disposed in the conduit channel of its respective drum;
 connector means, disposed on each of said drums, and associated with its respective flexible conduits, for connecting and disconnecting said one end of said respective flexible conduit to a flowpath portion of said at least a fixed riser conduit, said respective drum being fixed with respect to said fixed riser conduit when connected to said flowpath portion; and
 means for connecting another end of said plurality of flexible conduits to said vessel, where a respective drum and its associated conduit channel defining means, flexible conduit, said one end connector means and said another end connecting means all comprising a means for permitting rotation of said vessel about a connection arc associated with a respective drum while said connector means is connected to said flowpath portion, wherein the sum of all connection arcs is greater than 360° and said each connection arc associated with a respective drum overlaps a connection arc associated with an adjacent drum and at least one of said connecting means is always connected when said vessel is within said drum's respective connecting arcs.

* * * * *